United States Patent
Hashimura

(10) Patent No.: US 7,458,611 B2
(45) Date of Patent: Dec. 2, 2008

(54) MOUNT STRUCTURE FOR FUEL TANK

(75) Inventor: Tadayoshi Hashimura, Machida (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/412,979

(22) Filed: Apr. 28, 2006

(65) Prior Publication Data

US 2006/0197332 A1    Sep. 7, 2006

Related U.S. Application Data

(62) Division of application No. 10/772,250, filed on Feb. 6, 2004, now Pat. No. 7,063,355.

(30) Foreign Application Priority Data

Feb. 12, 2003   (JP) ............................. 2003-033943
Sep. 1, 2003    (JP) ............................. 2003-309146

(51) Int. Cl.
*B60P 3/00* (2006.01)

(52) U.S. Cl. ................................................. 280/830

(58) Field of Classification Search ............... 280/124, 280/109, 781, 784, 785, 834, 830; 211/71.01, 211/113, 85.29
See application file for complete search history.

(56) References Cited

U.S. PATENT DOCUMENTS

| | | | |
|---|---|---|---|
| 1,611,906 A | 12/1926 | Gurney | |
| 4,717,171 A | 1/1988 | Kami et al. | |
| 5,201,547 A * | 4/1993 | Ogawa et al. | 280/834 |
| 5,518,272 A | 5/1996 | Fukagawa et al. | |
| 5,542,707 A | 8/1996 | Kamei et al. | |
| 5,556,133 A | 9/1996 | Oku et al. | |
| 5,560,651 A | 10/1996 | Kami et al. | |
| 5,702,125 A | 12/1997 | Nakajima et al. | |
| 5,924,734 A | 7/1999 | Fukagawa et al. | |
| 6,086,103 A | 7/2000 | Fukagawa et al. | |
| 6,672,260 B1 | 1/2004 | Sun | |
| 6,672,620 B2 * | 1/2004 | Kawazu et al. | 280/834 |
| 6,824,168 B2 | 11/2004 | Kawazu et al. | |
| 6,983,945 B2 * | 1/2006 | Kawasaki et al. | 280/834 |
| 2002/0121772 A1 | 9/2002 | Koster | |
| 2002/0140220 A1 * | 10/2002 | Tatsumi et al. | 280/781 |
| 2003/0189334 A1 | 10/2003 | Kawasaki et al. | |
| 2004/0239095 A1 | 12/2004 | Wozniak et al. | |

FOREIGN PATENT DOCUMENTS

| | | | |
|---|---|---|---|
| JP | 62-251218 A | | 11/1987 |
| JP | 04011517 A | * | 1/1992 |
| JP | 06286642 A | * | 10/1994 |
| JP | 9-076774 A | | 3/1997 |
| JP | 2001-146115 A | | 5/2001 |
| JP | 2002-046484 A | | 2/2002 |

* cited by examiner

*Primary Examiner*—Joanne Silbermann
*Assistant Examiner*—Daniel Yeagley
(74) *Attorney, Agent, or Firm*—Foley & Lardner LLP

(57) ABSTRACT

A fuel tank mount structure, to be placed in a lower area of a floor formed in a vehicle body, is provided including a rear suspension member (13) disposed rearward of the fuel tank and having a front edge portion formed with a front suspension cross member (27) formed in a configuration contoured along a rear profile of the fuel tank.

9 Claims, 6 Drawing Sheets

MOUNT STRUCTURE FOR FUEL TANK

The present application is a divisional of U.S. application Ser. No. 10/772,250, filed Feb. 6, 2004, now U.S. Pat. No. 7,063,355 issued Jan. 20, 2006, which in turn claims benefit of priority under 35 U. S. C. § 119 to Japanese Patent Applications No. 2003-33943, filed on Feb. 12, 2003 and No. 2003-309146, filed on Sept. 1, 2003.

BACKGROUND OF THE INVENTION

1. Field of the invention

The present invention relates to a fuel tank mount structure for allowing a fuel tank to be efficiently located below a floor of a rear area of a vehicle body.

2. Description of the Related Art

Heretofore, when installing a highly pressurized fuel tank such as a CNG bomb on a vehicle, a vehicle body structure is disclosed wherein a fuel tank mounting structure is located below a floor of a vehicle body through a tank mount structure (refer to Japanese Patent Application Laid-Open Nos. 2002-46484 and 2001-146115).

SUMMARY OF THE INVENTION

However, since various vehicle body components, such as a suspension, are located below a floor of the rear of the vehicle body, it is hard to provide a sufficient space to allow the fuel tank to be located.

Therefore, it is an object of the present invention to provide a fuel tank mount structure that has a high space efficiency.

In order to achieve the above object, the present invention contemplates to provide a fuel tank mount structure to allow a high pressure fuel tank to be mounted below a floor of the rear of a vehicle body, wherein a front edge portion of a rear suspension member disposed in a rear area of the high pressure fuel tank is formed along a rear profile of the high pressure fuel tank.

DETAILED DESCRIPTION OF THE PREFERRED EMBODIMENT

Hereinafter, embodiments of the present invention are described with reference to the accompanying drawings.

First Embodiment

Figure 1:
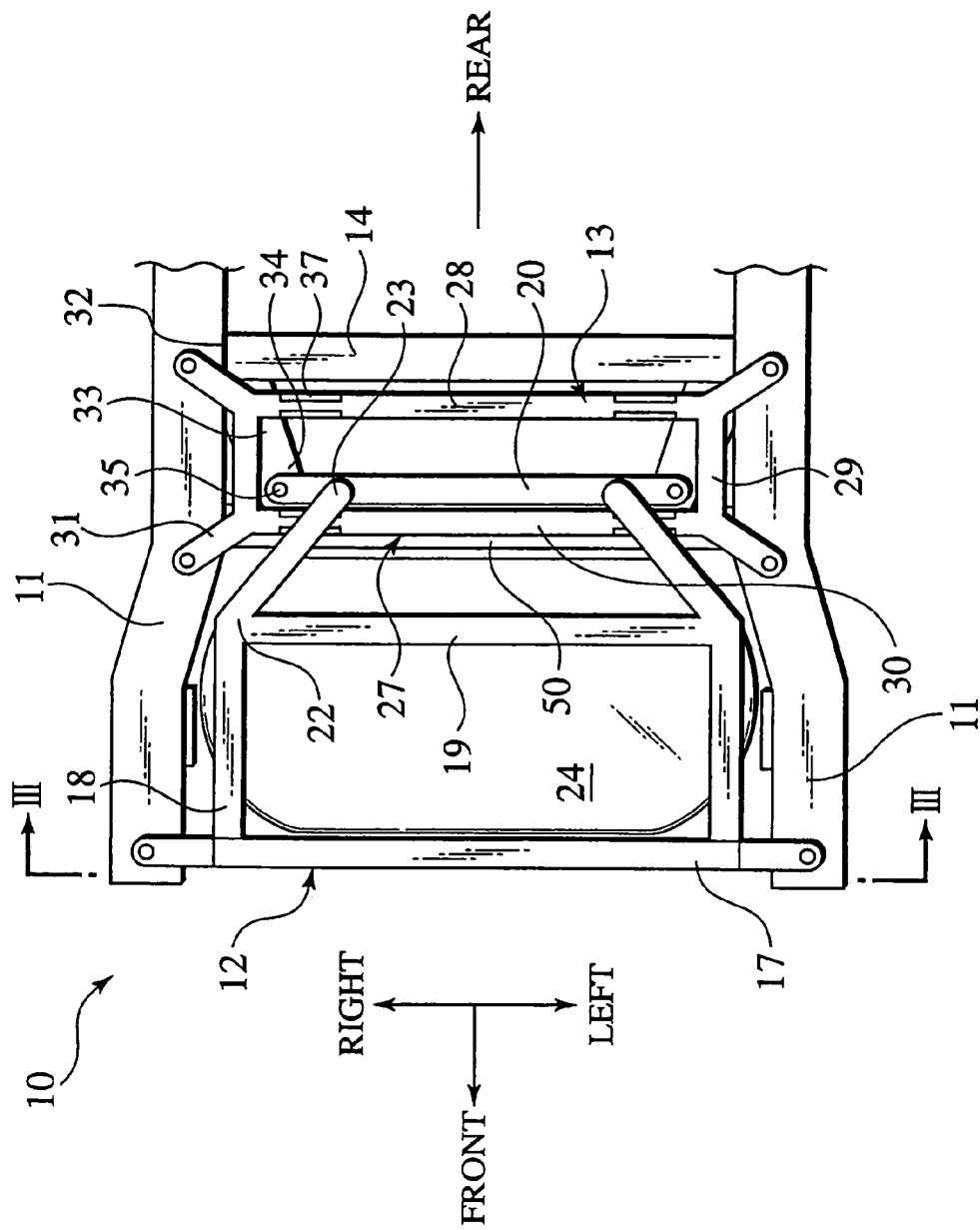
FIG. 1 is a bottom view of a lower area of a vehicle body having a fuel tank mount structure, as viewed from the bottom, of a first embodiment of the present invention.

A vehicle body rear section 10, to which a fuel tank mount structure of a first embodiment is applied, is configured in a structure as shown in FIG. 1. Rear side members 11, 11 extending fore and aft direction of a vehicle are disposed beneath a floor (not shown) of the vehicle, and a first tank frame 12 is disposed below the rear side members 11, 11. The first tank frame 12 supports a fuel tank 24, being filled with such as a hydrogen gas. A rear suspension member 13 is disposed in a rear area of the first tank frame 12. And a rear cross member 14 is disposed in a rear side of the suspension member 13. Hereinafter, these components will be described in detail.

Figure 3:
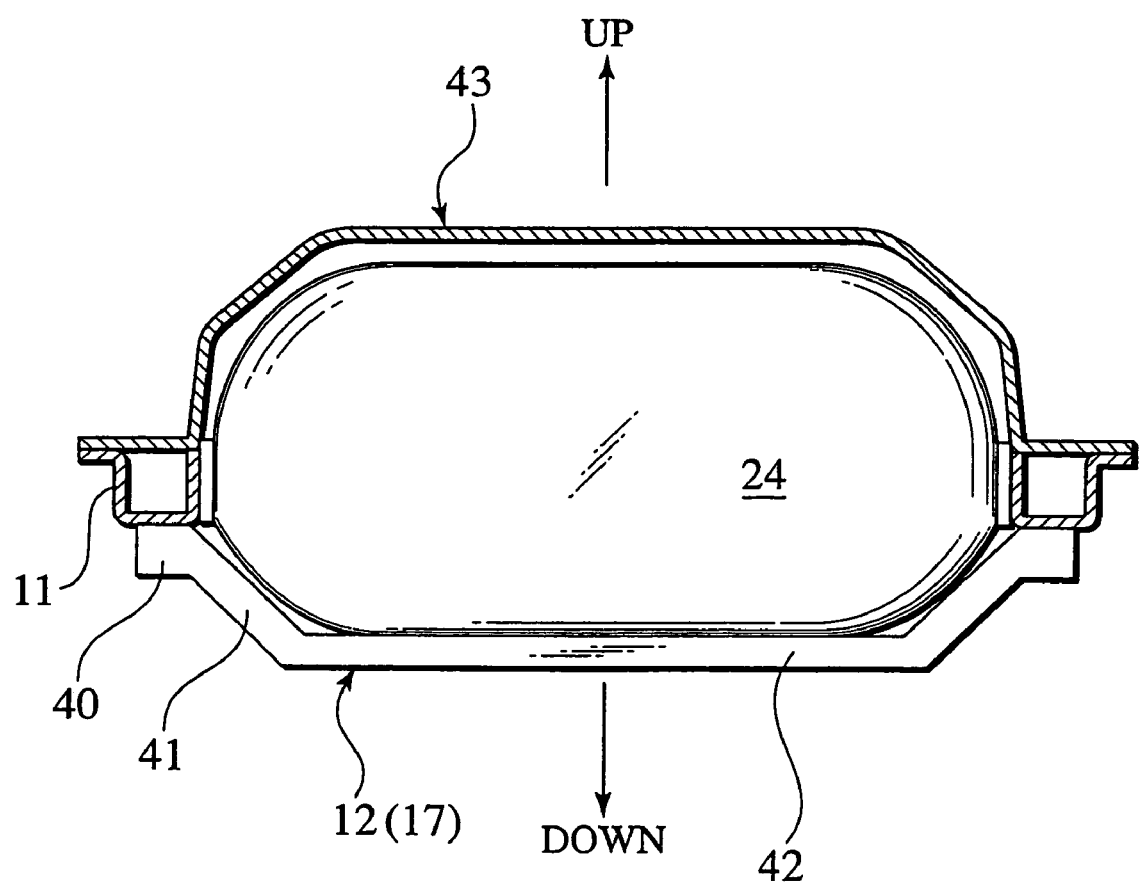
FIG. 3 is a cross sectional view taken on line III-III of FIG. 1, with the fuel tank mount structure being shown in upside down with respect to that of FIG. 1.

As shown in FIG. 3, the rear side members 11, 11 are disposed beneath a floor panel 43, and disposed on the both ends in the vehicle widthwise direction.

Figure 2:
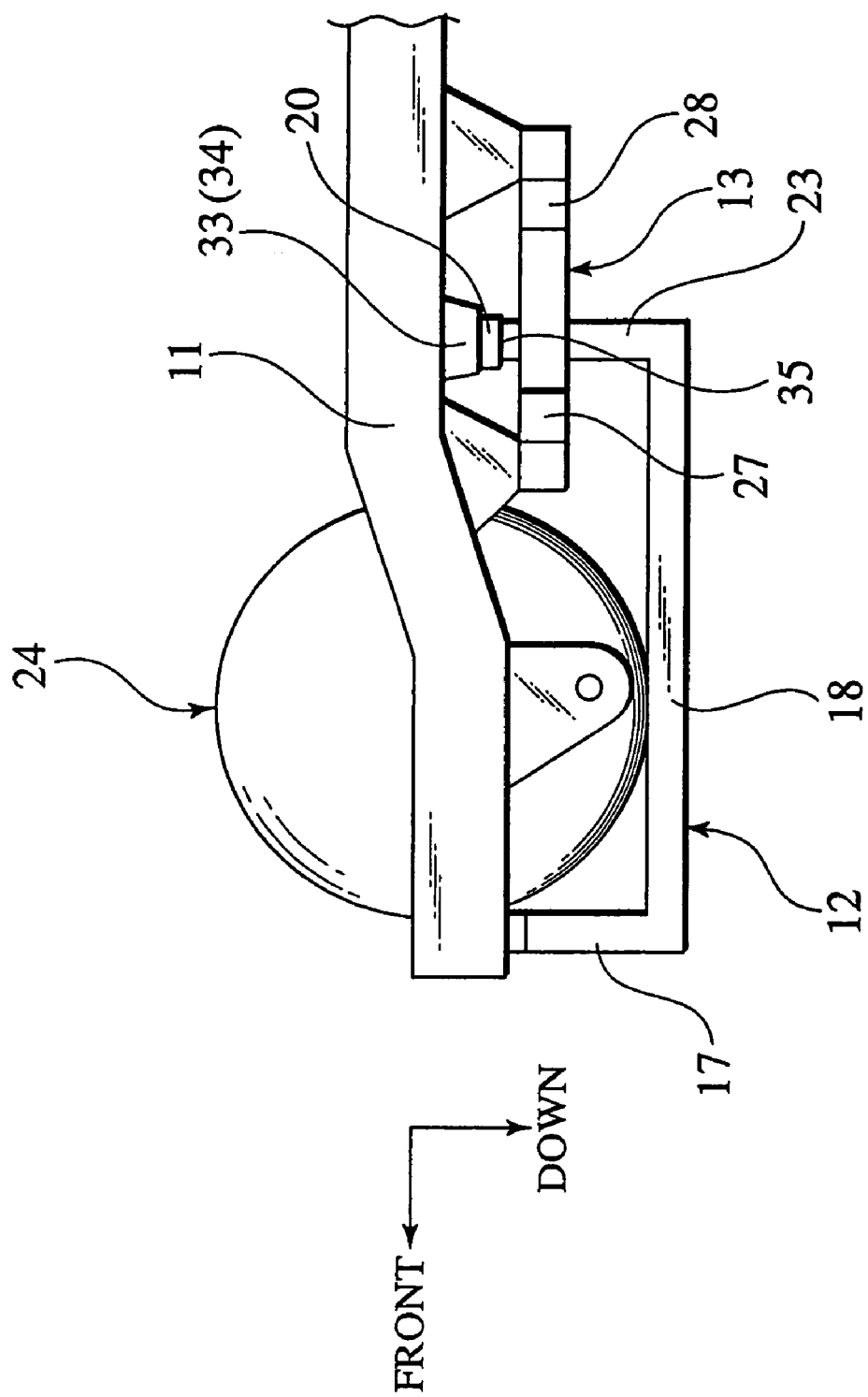
FIG. 2 is a side view showing the fuel tank mount structure in upside down with respect to that of FIG. 1.

Further, as shown in FIG. 2, located below front portions of the rear side members 11, the first tank frame 12 is disposed. As shown in FIG. 1, the first tank frame 12 is comprised of a front cross frame 17 laterally extending on a front side, side frames 18, 18 extending rearward of the vehicle at both left and right ends of the center cross member 17, a center cross member 19 fastened to central areas of the side frames 18, 18 in respect of the fore and aft direction of the vehicle, and a rear cross member 20 fastened to rear ends of the side frames 18, 18.

The front cross frame 17 extends in the vehicle widthwise direction to allow the left and right rear side members 11, 11 to be bridged. The side frames 18, 18 extend rearward of the vehicle from the front cross frame 17. The side frames 18 extend rearward of the vehicle and bend inward in the vehicle widthwise direction at joints 22, 22 of the center cross frame 19, and as shown in FIG. 2, rear end portions 23, 23 of the side frames 18, 18 are bent upward and coupled to the rear cross frame 20.

The rear suspension member 13 is disposed rearward of the vehicle and above the first tank frame 12 and is formed in a double cross shape as shown in FIG. 1. The rear suspension member 13 is comprised of a front suspension cross member 27 disposed on a forward area of the rear suspension member 13 and extending in the vehicle widthwise direction, a rear suspension cross member 28 disposed rearward of the front suspension cross member 27 on a rear side of the vehicle and extending in the vehicle widthwise direction, and suspension side members 29, 29 connecting the front suspension cross member 27 and the rear suspension cross member 28. Both the left and right ends of the front suspension cross member 27 and the rear suspension cross member 28 are fastened to lower surfaces of the rear side members 11, respectively.

Further, the front suspension cross member 27 is comprised of a body portion 30 formed in a central area in the vehicle widthwise direction, and a pair of extensions 31, 31 extending forward of the vehicle at left and right ends of the body portion 30, the body portion 30 and the extensions 31 being formed along a rear profile of the fuel tank 24.

The rear cross member 14 connects the rear side members 11, 11 to allow these components 11, 11 to be bridged in the vehicle widthwise direction at connecting portions 32, 32, and tank mount brackets 33, 33 extend from the connecting portions 32, 32 to the front side of the vehicle. The tank mount brackets 33, 33 are mounted in the same height as the rear cross member 14. Fastening portions 35, 35 of both left and right ends of the rear cross member 20 of the tank frame 12 are mounted below distal ends 34, 34 of the tank mount brackets 33, 33. Also, front ends of the tank mount brackets 33, 33 are mounted to lower surfaces of the cross member 50 through which the rear side members 11, 11 are bridged.

As shown in FIG. 2, the fastening portions 35, 35 are disposed between the front suspension cross member 27 and the rear suspension cross member 28. Here, the rear suspension member 13 is placed between the side frames 18, 18 of the first tank frame 12 and the tank mount bracket 33.

Further, as shown in FIG. 1, rear suspension brackets 37 serving as a rear suspension fastening segment protrudes downwardly. The side frames 18, 18 are provided below the suspension brackets 37, 37 as shown in FIG. 1.

Further, as shown in FIG. 3, both the left and right sides of the front cross frame 17 are formed in approximately a trapezoid shape. That is, the front cross frame 17 of the first tank frame is comprised of both left and right end portions 40, 40 fastened to the lower surfaces of the rear side members 11, 11 respectively, inclined portions 41, 41 extending from both the left and right end portions 40, 40 and sloping downwardly of the vehicle toward a center in the vehicle widthwise direction, respectively, and a bottom portion 42 connected to terminal ends of the left and right inclined portions 41, 41, respectively. Also, as shown in FIG. 3, a floor panel 43 of the vehicle body is configured to form along an upper profile of the fuel tank 24.

The fuel tank mount structure of the first embodiment having the structure set forth above has various advantages listed below.

First, as already described above with reference to FIG. 1, since the fuel tank 24 is located in a space defined by the rear suspension member 13 and the rear side members 11, 11, and the front suspension cross member 27 forming a front edge portion of the rear suspension member 13 is formed in a shape contoured along the rear profile of the fuel tank 24, a gap between the fuel tank 24 and the rear suspension member 13 can be minimized, resulting in a capability of improving a space efficiency in an area below the floor panel 43.

Further, since the tank mount brackets 33, 33 are mounted to the joint portions 32, 32 between the rear side members 11, 11 and the rear cross member 14, an improved rigidity of the vehicle body can be obtained. And therefore, it is possible for the connecting portions 32, 32 to be restricted from being deformed due to impact loads applied to the rear of the vehicle.

In addition, as described with reference to FIG. 3, due to the presence of the first tank frame 12 having the front cross frame 17 is configured to extend upward of the vehicle and outward in the vehicle widthwise direction in a gradual slope toward the rear side members 11, 11, such a structure contributes to an increase in a rigidity of the vehicle body, while enabling the vehicle body from being deformed due to impact loads, such as sidewise collisions, applied to a side of the vehicle.

And, as shown in FIG. 2, since the fastening portions 35, 35 being located at the rear side of the first tank frame 12 are disposed between the front suspension cross member 27 and the rear suspension cross member 28 of the rear suspension member 13, the first tank frame 12 for the fuel tank 24 can be fastened to the vehicle body while permitting the rear surface of the fuel tank 24 to be placed near the rear suspension member 13 as close as possible. Also, according to this structure, it is possible to alleviate an impact load applied to the vehicle from the longitudinal direction of the vehicle.

Furthermore, as shown in FIG. 2, since the side frames 18 connecting the fore and aft portions of the first tank frame 12 are located below the rear suspension brackets 37, 37 that serve as rear suspension fastening portions of the rear suspension member 13, the side frames 18, 18 do not obstruct the movement of the suspension, and therefore the fuel tank 24 and the suspension can be placed in a high space efficiency.

Also, although a distance between the rear terminal portions of the side frames 18, 18, bent inward in the vehicle widthwise direction on the both sides of the side frames 18 is shortened because the side frames 18 of the first tank frame 12 are located below the rear suspension bracket pairs 37, the presence of the rear terminal portions of the side frames 18 connected to the rear cross frame 20 while connecting the both ends of the rear cross frame 20 to the tank mount brackets 33 provides an improved degree of freedom in mounting to allow the first tank frame 12 to be fastened to a highly rigidity area of the vehicle body, enabling the rear end portions of the first tank frame 12 to have an increased mount span in the vehicle widthwise direction while improving a mount rigidity of the first tank frame 12.

Second Embodiment

A second embodiment of this invention is described below, with the same component parts as those of the first embodiment bearing like reference numerals for omitting redundant description.

Figure 4:
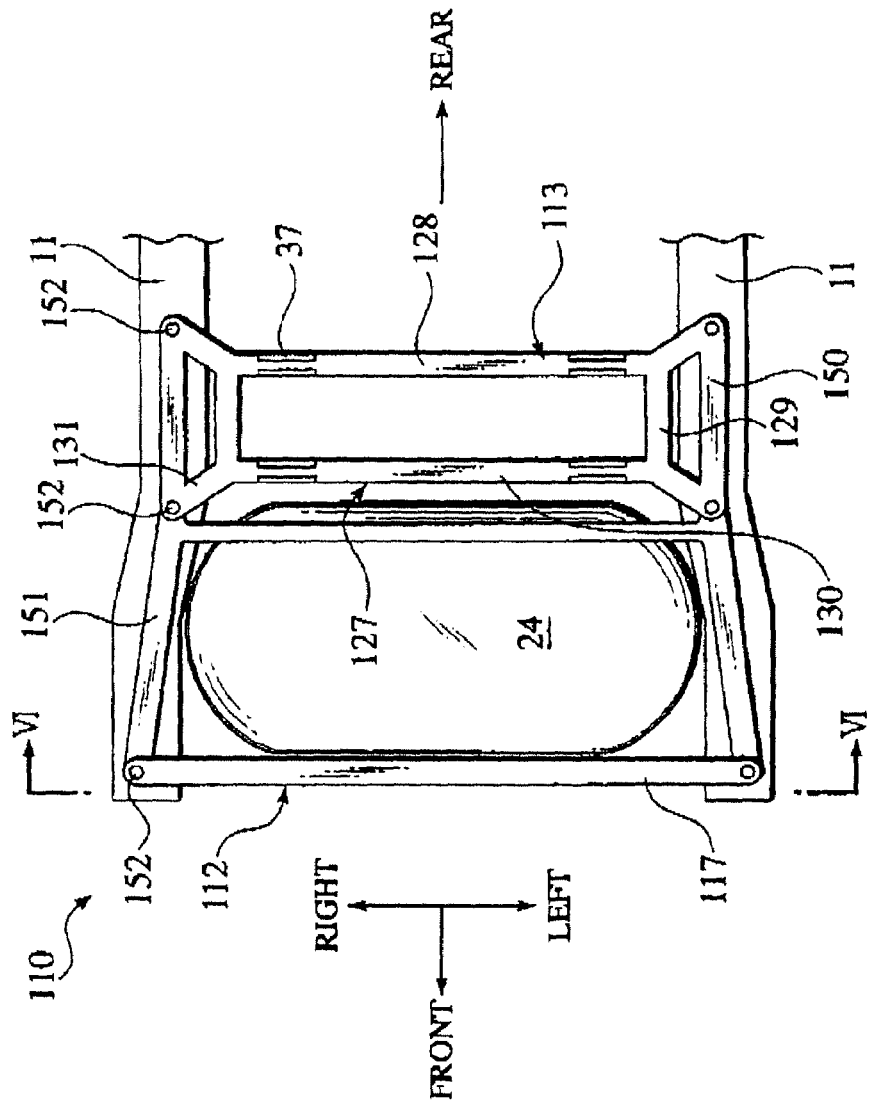
FIG. 4 is a bottom view of a lower area of a vehicle body having a fuel tank mount structure of a second embodiment of the present invention.

FIG. 4 is a bottom view of a vehicle body rear section 110, to which a fuel tank mount structure of a second embodiment is applied, as viewed from the bottom. Like in the first embodiment set forth above, the rear side members 11, 11 extending fore and aft direction of the vehicle are disposed on both sides of the vehicle body in the widthwise direction-thereof And, a rear suspension member 113 is placed in a rear area of the fuel tank 24, and a second tank frame 112 is placed so as to straddle over the fore and aft areas of the fuel tank 24.

The rear suspension member 113 is unitarily comprised of a front suspension cross member 127 positioned in the front of the rear suspension member 113 and extending in the vehicle widthwise direction, a rear suspension cross member 128 positioned rearward of the front suspension cross member 127 and extending in the vehicle widthwise direction, side suspension cross members 150, 150 connecting both left and right ends of the front suspension cross member 127 and the rear suspension cross member 128, and suspension side members 129, 129 disposed inside the side suspension cross members 150, 150, respectively, in the vehicle widthwise direction and extending in the fore and aft direction of the vehicle while connected to the front suspension cross member 127 and the rear suspension cross member 128, respectively.

The front suspension cross member 127 and the rear suspension cross member 128 are placed so as to allow the left and right rear side members 11, 11 to be bridged. Also, the front suspension cross member 127 is unitarily further comprised of a body portion 130 linearly formed in a central area in the vehicle widthwise direction, and extensions 131, 131 extending obliquely forward of the vehicle from both left and right ends of the body portion 130. The body portion 130 and the extensions 131, 131 being formed in configuration contoured along the rear profile of the fuel tank 24. Additionally, the side suspension cross members 150 are disposed in the fore and aft direction of the vehicle along the lower surfaces of the rear side members 11.

And, as shown in FIG. 4, the second tank frame 112 is formed in a substantially U-shape in a plan view and comprised of a front cross frame 117 located in a front side, and side frames 151, 151 extending from both left and right ends of the front cross frame 117 toward the both left and right ends of the front suspension cross member 127. Also, the both left and right ends of the rear suspension member 113, the front cross frame 117 and the side frames 151 are mounted to the rear side members 11 by means of fastening units 152. Moreover, rear ends of the side frames 151 are integrally connected to the front ends of the side suspension cross members 150 and the both left and right ends of the side suspension cross members 127 by means of fastening units 152. Thus, the second tank frame 112 is integrally formed with the rear suspension member 113 (into a module structure).

Figure 5:
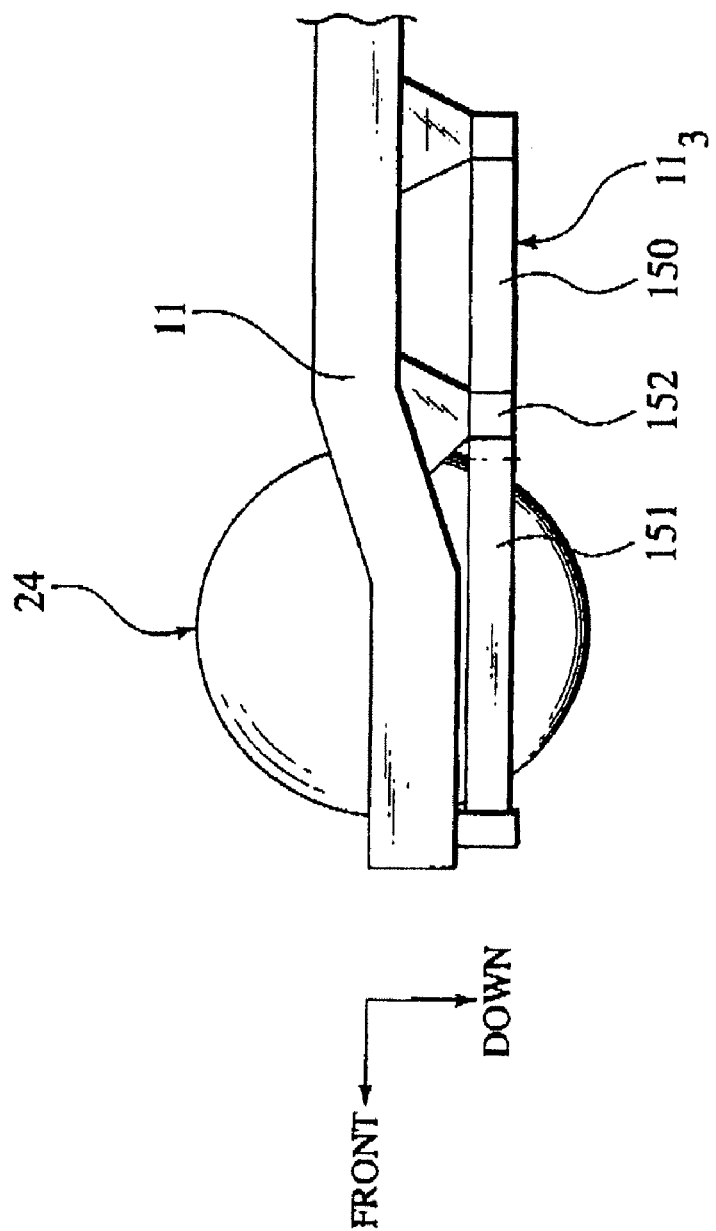
FIG. 5 is a side view showing the fuel tank mount structure of FIG. 4.

Additionally, as shown in FIG. 5, the side frames 151 forming the second tank frame 112 are linearly and integrally connected to the side suspension cross members 150 of the rear suspension member 113 by means of the fastening units 152 to form a module structure. Also, the side frames 151 are placed in substantially the same height as that of the side suspension cross members 150.

Figure 6:
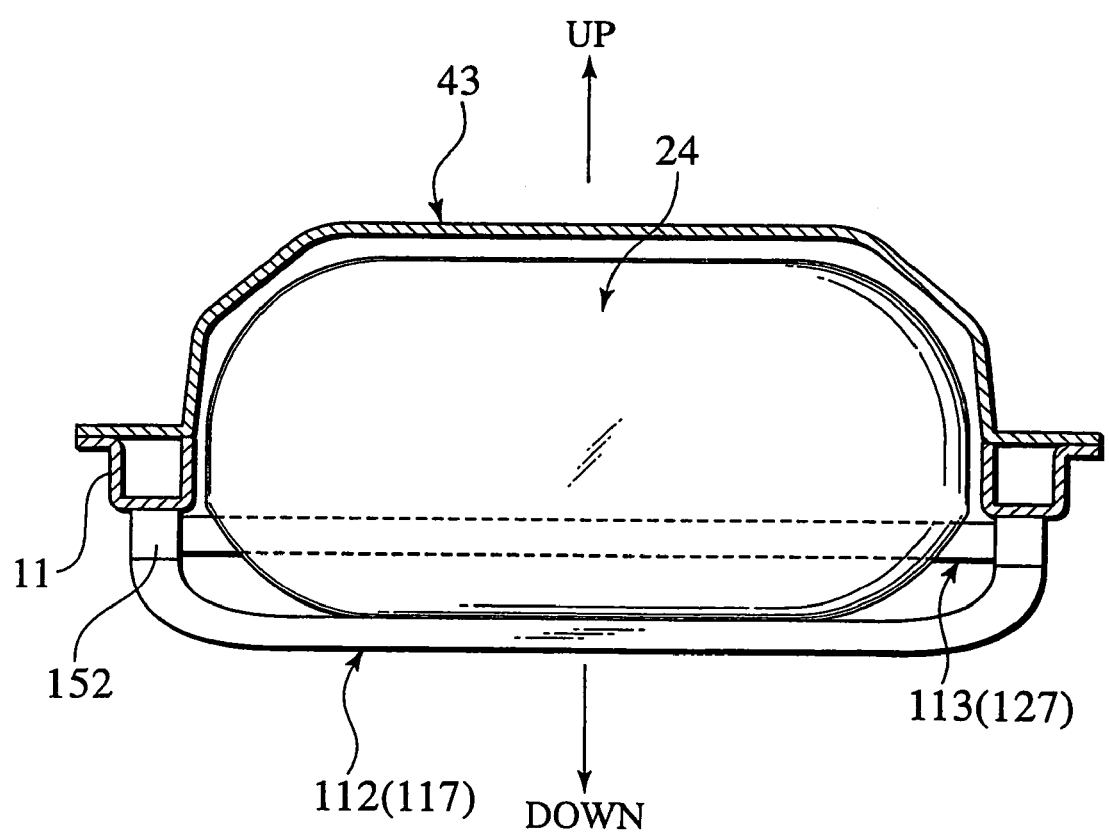
FIG. 6 is a cross sectional view taken on line VI-VI of FIG. 4.

Furthermore, as shown in FIG. 6, the both left and right ends of the front cross frame 117 forming the second tank frame 112 are mounted to lower ends of the fastening units 152 located beneath the rear side members 11. That is, the fastening units 152 are located beneath the rear side members 11, and the front cross frame 117 extends from the lower ends of the fastening units 152 obliquely downward and gradually curved inward in the vehicle widthwise direction. Also, on the rear side of the front cross frame 117, the rear suspension member 113 is linearly connected to the left and right rear side members 11, 11.

The fuel tank mount structure of the second embodiment set forth above has various advantages described below.

Since the second tank frame 112 is formed with the rear suspension member 113 in the unitary (module) structure, the rear suspension member 113 can be placed closer to the fuel tank 24 without wasteful space between the rear suspension member 113 and the fuel tank 24 while achieving reduction in the number of component parts, resulting in a capability of reducing cost and providing a light weight while improving a production efficiency.

Further, since the second tank frame 112 and the rear suspension member 113 are located by connecting the left and right rear side members 11, 11 with respect to one another, a strength of the vehicle body can be improved and, especially, the vehicle body is able to have a rigidity against loads, such as sidewise collisions, to be applied to the side of the vehicle body.

Additionally, since the side frames 151, 151 of the second tank frame 112 are disposed in the fore and aft direction of the vehicle body along the lower surfaces of the rear side members 11, 11 and both ends of the front cross frame 117 and the front suspension cross member 127 are connected to one another by means of the fastening units 152 in a bridged form, it becomes possible for the vehicle body to have an increased rigidity that resists against loads, such as rear collisions, applied to the rear of the vehicle.

Although the invention has been described above by reference to certain embodiments of the present invention, the invention is not limited to the embodiments described above and will occur to those skilled in the art, in light of the teachings. The scope of the invention is defined with reference to the following claims.

What is claimed is:

1. A fuel tank mount structure for allowing a fuel tank to be placed in a lower area of a floor located in a rear area of a vehicle body, comprising:
    a rear suspension member having a front cross member, a rear cross member and a pair of right and left suspension cross members connecting either of left ends of the front cross member and the rear cross member or right ends of the front cross member and the rear cross member, said rear suspension member being disposed rearward of the fuel tank; and
    a tank frame for holding the fuel tank having a front cross frame and a pair of right and left side frames,
    wherein the right side frame is connected to a front end of the right side suspension cross member at a joint which is fixed to a right rear side member of the vehicle body, and the left side frame is connected to a front end of the left side suspension cross member at a joint which is fixed to a left rear side member of the vehicle body,
    wherein the front cross member is provided with a pair of extensions extending forwardly and outwardly from either end of the front cross member to form a configuration contoured along a rear profile of the fuel tank, and
    wherein left ends of the rear cross member and the front cross frame of the tank frame are mounted to a bottom face of the left rear side member of the vehicle body, and right ends of the rear cross member and the front cross frame of the tank frame are mounted to a bottom face of the right rear side member of the vehicle body.

2. The fuel tank mount structure according to claim 1, wherein the left and right side frames of the tank extend along the left and right rear side members disposed on left and right sides of the vehicle body.

3. The fuel tank mount structure according to claim 1, wherein the right side frame extends along the right rear side member disposed on a right side of the vehicle body, wherein the left side frame extends along the left rear side member disposed on a left side of the vehicle body, and wherein the front cross frame connects the right and left side frames.

4. The fuel tank mount structure according to claim 3, wherein the tank frame comprises another lateral cross frame connecting the right and left side frames.

5. The fuel tank mount structure according to claim 1, wherein the rear suspension member is provided with a pair of rear extensions extending backwards and outwardly from either end of the rear cross member.

6. The fuel tank mount structure according to claim 5, wherein one of the left and right side suspension cross members connects one of the pair of extensions to one of the pair of rear extensions.

7. The fuel tank mount structure according to claim 6, wherein the other of the left and right side suspension cross members connects the other of the pair of extensions to the other of the pair of rear extensions.

8. The fuel tank mount structure according to claim 7, wherein the rear suspension member has first and second inner suspension side members connecting the front cross member to the rear cross member.

9. The fuel tank mount structure according to claim 8, wherein the first and second inner suspension side members are disposed inside the left and right side suspension cross members.

* * * * *